US010791548B2

(12) United States Patent  (10) Patent No.: US 10,791,548 B2
Yang et al.  (45) Date of Patent: Sep. 29, 2020

(54) SEARCH SPACE DESIGN FOR CONTROL CHANNEL IN WIRELESS COMMUNICATION

(71) Applicant: QUALCOMM Incorporated, San Diego, CA (US)

(72) Inventors: Yang Yang, San Diego, CA (US); Tao Luo, San Diego, CA (US); Peter Pui Lok Ang, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 15/291,666

(22) Filed: Oct. 12, 2016

(65) Prior Publication Data

US 2017/0318563 A1  Nov. 2, 2017

Related U.S. Application Data

(60) Provisional application No. 62/330,349, filed on May 2, 2016.

(51) Int. Cl.
*H04W 72/04* (2009.01)
*H04L 5/00* (2006.01)

(52) U.S. Cl.
CPC ......... *H04W 72/042* (2013.01); *H04L 5/0032* (2013.01); *H04L 5/0051* (2013.01); *H04L 5/0053* (2013.01)

(58) Field of Classification Search
CPC .. H04W 72/042; H04L 5/0032; H04L 5/0053; H04L 5/0051
See application file for complete search history.

(56) References Cited

U.S. PATENT DOCUMENTS 9,065,493 B2  6/2015  Hong et al.
9,572,148 B2  2/2017  Park et al.
9,883,490 B1 *  1/2018  Hedayat ............ H04W 72/0453
(Continued)

FOREIGN PATENT DOCUMENTS

EP  2352242 A1  8/2011
WO  WO-2016064048 A1  4/2016

OTHER PUBLICATIONS

International Search Report and Written Opinion—PCT/US2017/030233—ISA/EPO—Jul. 25, 2017.
(Continued)

*Primary Examiner* — Omar J Ghowrwal
(74) *Attorney, Agent, or Firm* — Loza & Loza, LLP

(57) ABSTRACT

Aspects of the present disclosure provide various flexible search space designs that can handle UEs with various capabilities and limitations. In some aspects of the disclosure, the downlink bandwidth may be divided into several self-contained sub-bands. Each sub-band may include one or more OFDM subcarriers or tones, and each UE may be configured to monitor one or more of the sub-bands for its downlink control channel. The sub-band is self-contained in such a way that each sub-band includes CCEs that are mapped to resource elements contained in the same sub-band. In some aspects of the disclosure, different sub-bands can be configured with the different transmission modes and pilot densities. The transmission mode, pilot density, and layer-ID may be determined as a function of each UE's search space.

24 Claims, 14 Drawing Sheets

(56) References Cited

U.S. PATENT DOCUMENTS

| | | | |
|---|---|---|---|
| 2005/0025113 A1* | 2/2005 | Lestable | H04L 1/0006 370/343 |
| 2010/0027502 A1* | 2/2010 | Chen | H04L 5/0007 370/330 |
| 2012/0039196 A1* | 2/2012 | Zhang | H04L 25/03343 370/252 |
| 2013/0183987 A1 | 7/2013 | Vrzic et al. | |
| 2013/0235809 A1* | 9/2013 | Li | H04W 72/042 370/329 |
| 2015/0063503 A1* | 3/2015 | Kosakowski | H04L 1/0054 375/341 |
| 2018/0076924 A1 | 3/2018 | Lee et al. | |

OTHER PUBLICATIONS

LG Electronics: "Simultaneous Data Reception of MTC Ues", 3GPP TSG-RAN WG1#80bis, R1-151496, Apr. 11, 2015, 4 Pages, URL: http://www.3gpp.org/ftp/tsg_ran/WG1_RL1/TSGR1_80b/Docs/R1-151496.zip.

* cited by examiner

SEARCH SPACE DESIGN FOR CONTROL CHANNEL IN WIRELESS COMMUNICATION

PRIORITY CLAIM

This application claims priority to and the benefit of provisional patent application No. 62/330,349 filed in the United States Patent and Trademark Office on 2 May 2016, the entire content of which is incorporated herein by reference as if fully set forth below in its entirety and for all applicable purposes.

TECHNICAL FIELD

The technology discussed below relates generally to wireless communication systems, and more particularly, to search space design of a downlink control channel in wireless communication.

INTRODUCTION

In Long Term Evolution (LTE) networks, the Physical Downlink Control Channel (PDCCH) carries control information such as a resource allocation for uplink (UL) and/or downlink (DL) transmissions. There are many locations in a PDCCH DL radio frame where a specific PDCCH message is located, and a user equipment (UE) searches the possible locations to find its PDCCH message(s). A search space refers to the locations in a subframe assigned or allocated to a UE for finding the PDCCH message(s).

The search space indicates a set of Control Channel Elements from which the UE may find its PDCCH. There are two types of search space: the common search space and the UE-specific search space. The common search space may carry the common downlink control information (DCI) that is broadcasted to all UEs or a group of UEs, and the UE-specific search space may carry the DCI for a specific UE.

As the demand for mobile broadband access continues to increase, research and development continue to advance wireless communication technologies not only to meet the growing demand for mobile broadband access, but also to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the disclosure provides a method of wireless communication operable at a scheduling entity. The method divides a downlink bandwidth into a plurality of sub-bands, and allocates a search space to each of a plurality of subordinate entities. The search space includes one or more control channel elements (CCEs) each mapped to one or more resource element groups (REGs) that are located in a same one of the plurality of sub-bands. The method further transmits one or more downlink control messages to the plurality of subordinate entities utilizing the one or more CCEs.

Another aspect of the disclosure provides a method of wireless communication operable at a subordinate entity. The method receives a sub-band configuration including a plurality of sub-bands of a downlink bandwidth, and determines a search space including one or more control channel elements (CCEs). Each of the CCEs is mapped to one or more resource element groups (REGs) that are located in a same one of the plurality of sub-bands. The method further receives one or more downlink control messages from a scheduling entity utilizing the one or more CCEs.

Another aspect of the disclosure provides a scheduling entity configured for wireless communication. The scheduling entity includes a communication interface configured to communicate with a plurality of subordinate entities, a memory stored with executable code, and a processor operably coupled to the communication interface and memory. The processor is configured by the executable code to divide a downlink bandwidth into a plurality of sub-bands, and allocate a search space to each of the plurality of subordinate entities. The search space includes one or more control channel elements (CCEs) each mapped to one or more resource element groups (REGs) that are located in a same one of the plurality of sub-bands. The processor is further configured to transmit one or more downlink control messages, utilizing the communication interface, to the plurality of subordinate entities utilizing the one or more CCEs.

Another aspect of the disclosure provides a subordinate entity configured for wireless communication. The subordinate entity includes a communication interface configured to communicate with a scheduling entity, a memory stored with executable code, and a processor operably coupled to the communication interface and memory. The processor is configured by the executable code to receive a sub-band configuration including a plurality of sub-bands of a downlink bandwidth, and determine a search space including one or more control channel elements (CCEs). Each of the CCEs is mapped to one or more resource element groups (REGs) that are located in a same one of the plurality of sub-bands. The processor is further configured to receive one or more downlink control messages from the scheduling entity utilizing the one or more CCEs.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
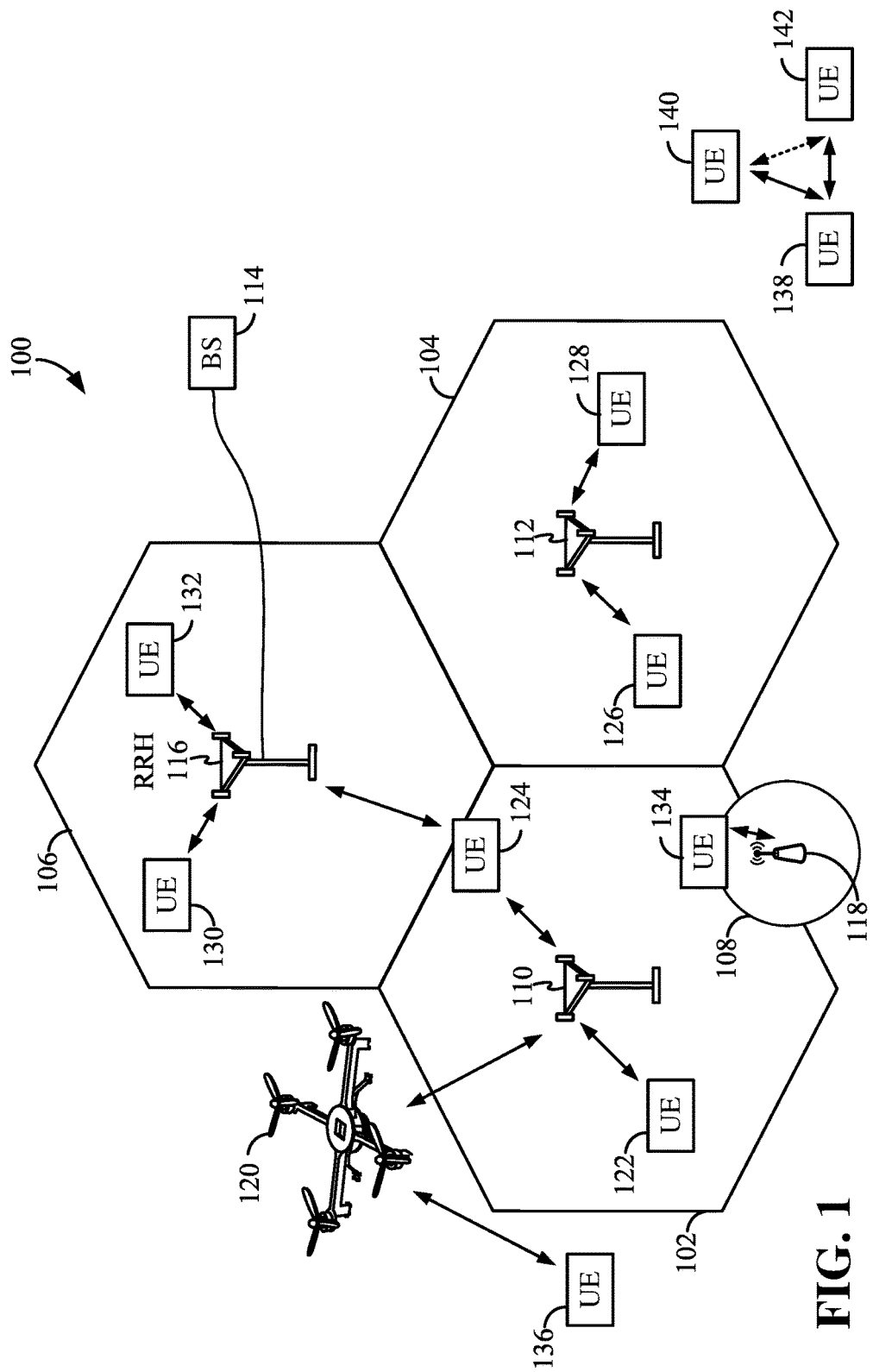
FIG. 1 is a conceptual diagram illustrating an example of an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

The next generation (e.g., 5G) networks may have a much larger bandwidth (BW) than the current 3G and 4G networks (e.g., Universal Mobile Telecommunications System (UMTS) and Long Term Evolution (LTE)). In a network similar to LTE, each user equipment (UE) may monitor a search space including a common search space and a UE-specific search space in a control region of a physical downlink control channel (PDCCH). A search space may include a set of control channel element (CCE) locations where a UE can find its downlink (DL) control channel or PDCCH messages. For example, the PDCCH carries the downlink control information (DCI) and other DL messages for the UE. One or more CCEs are used to transmit each PDCCH message. The CCEs assigned to a certain UE may span the entire bandwidth that may include a number of Orthogonal Frequency Division Multiplexing (OFDM) subcarriers or tones. However, a UE may not be able to access the entire downlink BW due to various reasons such as hardware constraints and/or power consumption limitations.

Aspects of the present disclosure provide various search space designs that have the flexibility to handle the various capabilities and limitations of different UEs. In some aspects of the disclosure, the entire downlink BW (or a portion of the entire downlink BW) may be divided into several self-contained sub-bands. Each sub-band may include one or more OFDM subcarriers or tones. In some examples, the sub-bands may have the same or different number of subcarriers. Each UE may be configured to monitor one or more of the sub-bands for its downlink control channel or PDCCH. The sub-band is self-contained in such a way that each sub-band includes CCEs that are mapped to resource elements (e.g., resource element groups) contained in the same sub-band.

In some aspects of the disclosure, the self-contained sub-bands may have different configurations in the same DL control channel. For example, the sub-bands may be broadcast control sub-bands or beamform-based control sub-bands. In a broadcast control sub-band, the scheduling entity (e.g., a base station) broadcasts a Cell-specific Reference Signal (CRS) that can be decoded by all the UEs in a common search space or sub-band. In a beamform-based control sub-band, a scheduling entity transmits user-specific downlink control channel (e.g., PDCCH) in a UE-specific search space. In a beamform-based control sub-band, the scheduling entity may transmit a UE-specific Reference Signal (UERS) for facilitating control demodulation to a target UE. Moreover, different UEs may have different channel profiles, which may lead to different search space designs. Some next generation networks may deploy multi-user multiple-input and multiple-output (MU-MIMO) radio link that may lead to different search space designs.

In some aspects of the disclosure, different sub-bands can be configured with the different transmission modes (e.g., MIMO modes) and pilot densities. The transmission mode, pilot density, and layer-ID may be determined as a function of each UE's search space as described in further detail herein.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided.

The geographic region covered by the access network 100 may be divided into a number of cellular regions (cells), including macrocells 102, 104, and 106, and a small cell 108, each of which may include one or more sectors. Cells may be defined geographically (e.g., by coverage area) and/or may be defined in accordance with a frequency, scrambling code, etc. In a cell that is divided into sectors, the multiple sectors within a cell can be formed by groups of antennas with each antenna responsible for communication with mobile devices in a portion of the cell.

In general, a radio transceiver apparatus serves each cell. A radio transceiver apparatus is commonly referred to as a base station (BS) in many wireless communication systems, but may also be referred to by those skilled in the art as a base transceiver station (BTS), a radio base station, a radio transceiver, a transceiver function, a basic service set (BSS), an extended service set (ESS), an access point (AP), a Node B, an eNode B, a scheduling entity, or some other suitable terminology.

In FIG. 1, two high-power base stations 110 and 112 are shown in cells 102 and 104; and a third high-power base station 114 is shown controlling a remote radio head (RRH) 116 in cell 106. In this example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In some examples, the base stations may be interconnected to one another and/or to one or more other base stations or network nodes (not shown) in the access network 100 through various types of backhaul interfaces such as a direct physical connection, a virtual network, or the like using any suitable transport network.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Within the present document, a "mobile" apparatus need not necessarily have a capability to move, and may be stationary. Some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, the quadcopter 120 may be configured to function as a UE. For example, the quadcopter 120 may operate within cell 102 by communicating with base station 110.

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (TDMA), orthogonal frequency division multiple access (OFDMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), or other suitable multiplexing schemes.

Within the access network 100, during a call with a scheduling entity, or at any other time, a UE may monitor various parameters of the signal from its serving cell as well as various parameters of neighboring cells. Further, depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities (e.g., UE) utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). For example, UE 138 is illustrated communicating with UEs 140 and 142. In this example, the UE 138 is functioning as a scheduling entity, and UEs 140 and 142 utilize resources scheduled by the UE 138 for wireless communication. A UE may function as a scheduling entity in a peer-to-peer (P2P) network, and/or in a mesh network. In a mesh network example, UEs 140 and 142 may optionally communicate directly with one another in addition to communicating with the scheduling entity 138.

Figure 2:
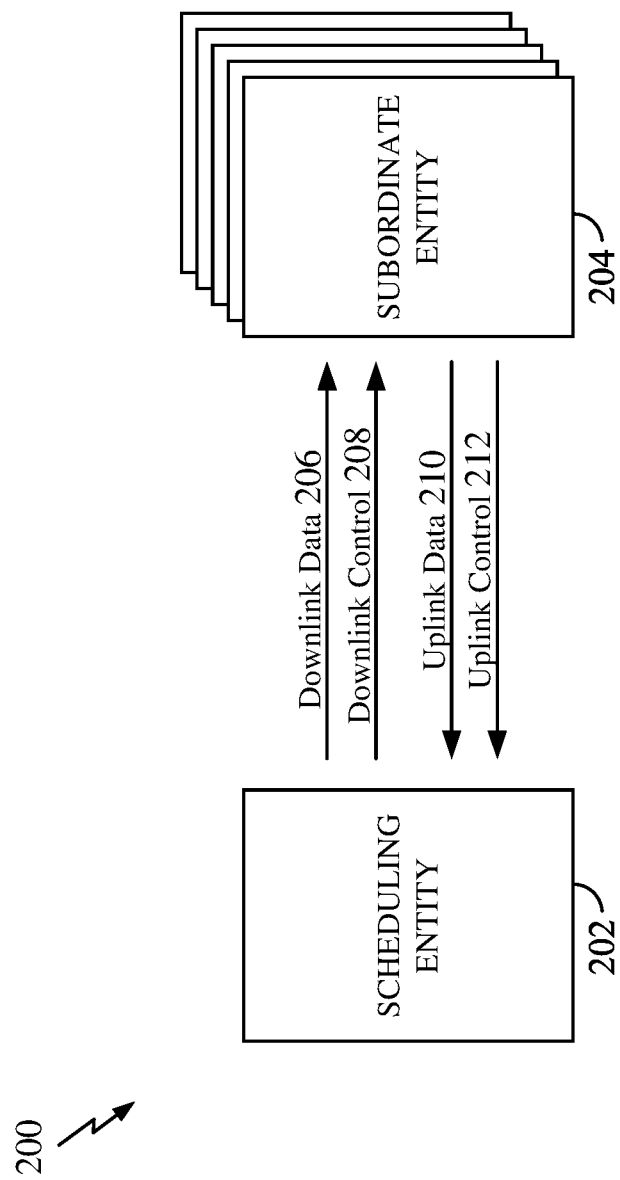
FIG. 2 is a block diagram conceptually illustrating an example of a scheduling entity communicating with one or more subordinate entities according to some aspects of the disclosure.

Thus, in a wireless communication network with a scheduled access to time—frequency resources and having a cellular configuration, a P2P configuration, and a mesh configuration, a scheduling entity, and one or more subordinate entities may communicate utilizing the scheduled resources. Referring now to FIG. 2, a block diagram illustrates a scheduling entity 202 and a plurality of subordinate entities 204. Here, the scheduling entity 202 may correspond to the base stations 110, 112, 114, and 118. In additional examples, the scheduling entity 202 may correspond to the UE 138, the quadcopter 120, or any other suitable node in the access network 100. Similarly, in various examples, the subordinate entity 204 may correspond to the UE 122, 124, 126, 128, 130, 132, 134, 136, 138, 140, and 142, or any other suitable node in the access network 100.

As illustrated in FIG. 2, the scheduling entity 202 may transmit broadcast and/or beamformed data 206 to one or more subordinate entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. Another way to describe the system may be to use the term broadcast channel multiplexing. In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202.

The scheduling entity 202 may transmit a control channel 208 to one or more subordinate entities 204. In one aspect of the disclosure, the control channel 208 may include one or more PDCCHs each carrying the DCI, reference signals, and/or other control messages to the corresponding subordinate entities 204. In some examples, PDCCH messages may be transmitted to one or more subordinate entities 204 utilizing various control channel elements (CCEs), and a search space of each of the subordinate entities includes one or more sub-bands including the corresponding CCEs. Uplink data 210 and/or downlink data 206 may be transmitted using a transmission time interval (TTI). Here, a TTI may correspond to an encapsulated set or packet of information capable of being independently decoded. In various examples, TTIs may correspond to frames, subframes, data blocks, time slots, or other suitable groupings of bits for transmission.

Furthermore, the subordinate entities 204 may transmit uplink control information 212 to the scheduling entity 202. Uplink control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit in the downlink control channel 208 information that may schedule the TTI for uplink packets. In a further example, the uplink control channel 212 may include hybrid automatic repeat request (HARQ) feedback transmissions, such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

The channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

Figure 3:
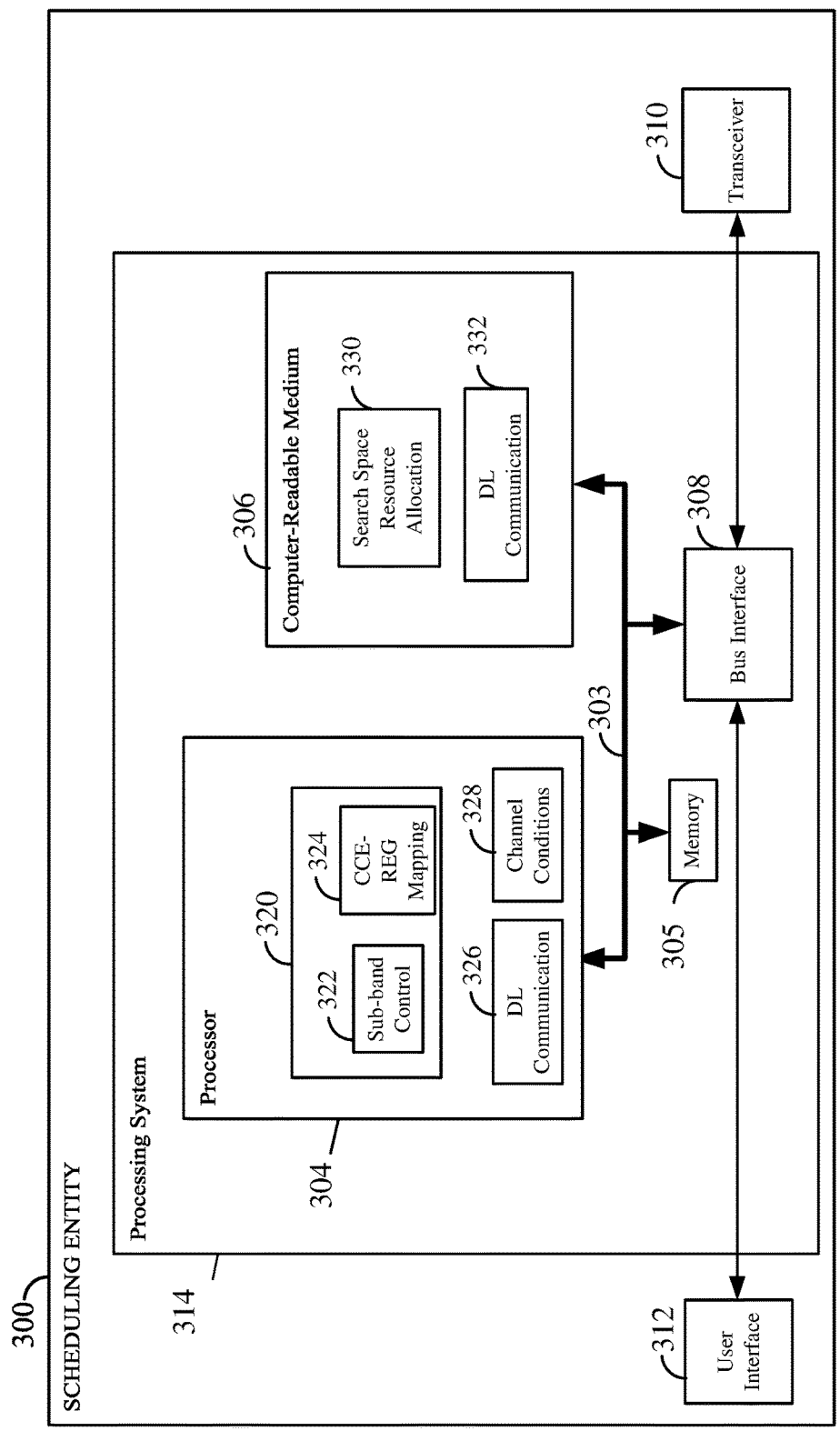
FIG. 3 is a block diagram illustrating an example of a hardware implementation for a scheduling entity employing a processing system according to an aspect of the disclosure.

FIG. 3 is a simplified block diagram illustrating an example of a hardware implementation for a scheduling entity 300 employing a processing system 314. For example, the scheduling entity 300 may be a user equipment (UE) as illustrated in any one or more of FIGS. 1 and/or 2. In another example, the scheduling entity 300 may be a base station as illustrated in any one or more of FIGS. 1 and/or 2.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes, for example, the search space and communication functions, described below and illustrated in FIGS. 7-14.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a communication interface or a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

In one aspect of the disclosure, the processor 304 may provide a search space control block 320. The search space control block 320 may be configured to provide various search space control related functions. The search space control block 320 may provide a sub-band control block 322 and a control channel element-resource element group (CCE-REG) mapping block 324. For example, the sub-band control block 322 may be used to divide a downlink bandwidth into a number of self-contained sub-bands similar to those described in relation to FIGS. 7-12. The CCE-REG mapping block 324 may be used to allocate a search space to a subordinate entity (e.g., UE) and map the REGs to the CCEs of the search space as described in more detail below.

The processor 304 may provide a DL communication block 326 and a channel conditions block 328. The DL communication block 326 may be used to perform DL communication functions including those described in relation to FIGS. 7-14. For example, the DL communication block 326 may utilize the self-contained sub-bands illustrated in FIGS. 7-12 to communicate DL control messages (e.g., PDCCH messages). The channel conditions block 328 may be used to determine a channel condition between the scheduling entity and the subordinate entities. For example, the channel conditions block 328 may be used to determine a signal-to-noise ratio (SNR), a delay spread, and/or other channel characteristics.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software configured for various functions, including, for example, the search space functions described in relation to FIGS. 7-14. The computer-readable medium 306 may store code that when executed by the processor 304 configures the apparatus 300 including the processor 304 to perform the functions described below in relation to FIGS. 7-14. The computer-readable medium 306 may provide search space resource allocation code 330 that may configure the scheduling entity to perform search space related functions such as sub-band division and CCE-REG mapping as described in detail below. The computer-readable medium 306 may provide DL communication code 332 that when executed may configure the scheduling entity to perform DL communications with various subordinate entities as described in relation to FIGS. 7-14.

Figure 4:
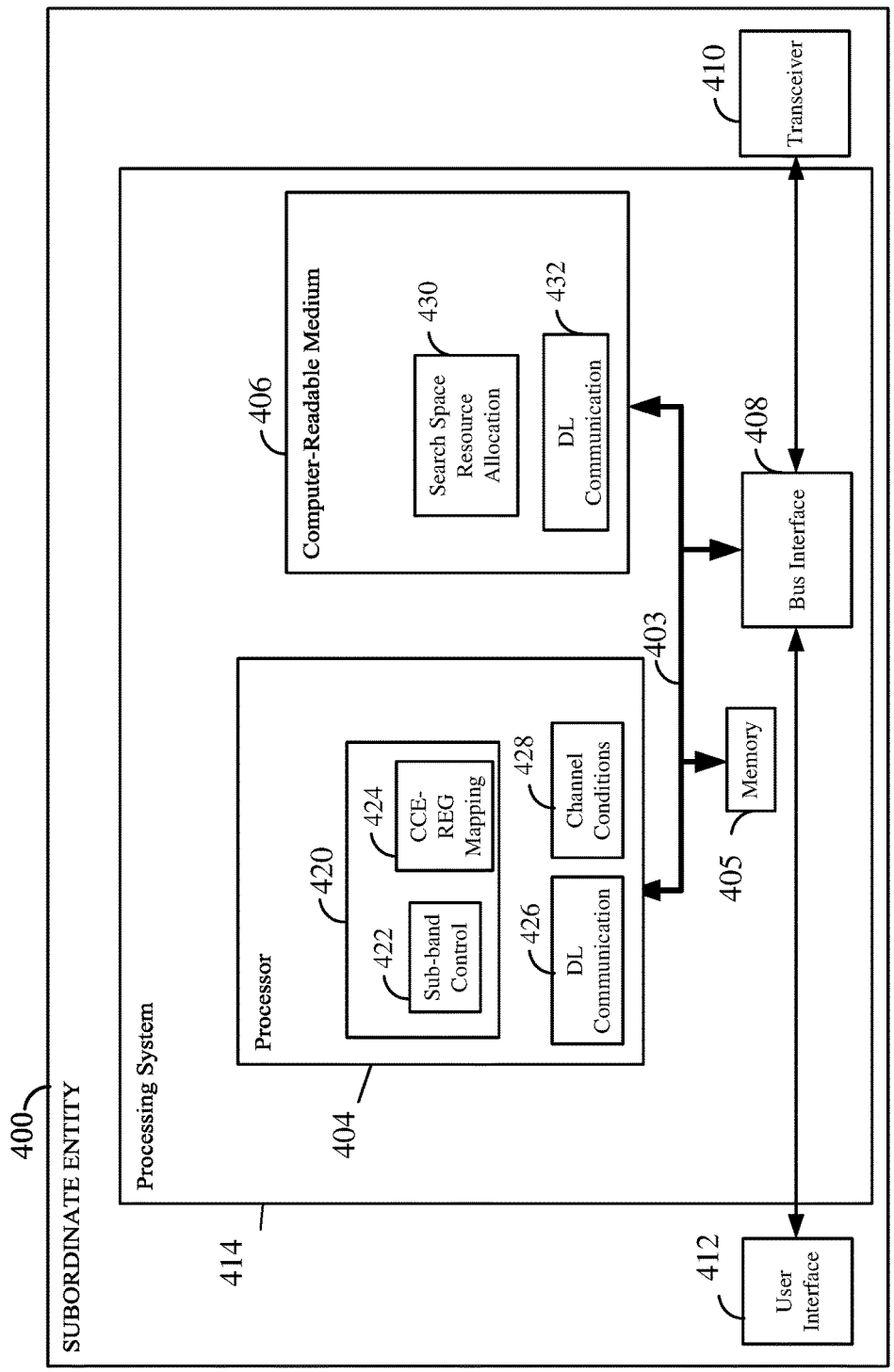
FIG. 4 is a block diagram illustrating an example of a hardware implementation for a subordinate entity employing a processing system according to an aspect of the disclosure.

FIG. 4 is a conceptual diagram illustrating an example of a hardware implementation for an exemplary subordinate entity 400 employing a processing system 414. In accordance with various aspects of the disclosure, an element, or any portion of an element, or any combination of elements may be implemented with a processing system 414 that includes one or more processors 404. For example, the subordinate entity 400 may be a user equipment (UE) as illustrated in any one or more of FIGS. 1 and/or 2.

The processing system 414 may be substantially the same as the processing system 314 illustrated in FIG. 3, including a bus interface 408, a bus 402, memory 405, a processor 404, and a computer-readable medium 406. Furthermore, the subordinate entity 400 may include a user interface 412 and a transceiver 410 substantially similar to those described above in FIG. 3. That is, the processor 404, as utilized in a subordinate entity 400, may be used to implement any one or more of the processes described below and illustrated in FIGS. 7-14. In some aspects of the disclosure, the processor 404 may include circuitry configured for various functions, including, for example, the search space related functions described below in relation to FIGS. 7-14.

In one aspect of the disclosure, the processor 404 may provide a search space control block 420. The search space control block 420 may be configured to provide various search space control related functions. The search space control block 420 may provide a sub-band control block 422 and a control channel element-resource element group (CCE-REG) mapping block 424. For example, the sub-band control block 422 may be used to determine one or more self-contained sub-bands for communication with a scheduling entity. The self-contained sub-bands may be the same as those described in relation to FIGS. 7-12. The CCE-REG mapping block 424 may be used to determine the mapping between REGs and CCEs that are assigned to the subordinate entity.

The processor 404 may provide a DL communication block 426 and a channel conditions block 428. The DL communication block 426 may be used to perform DL communication functions including those described in relation to FIGS. 7-14. For example, the DL communication may utilize the self-contained sub-bands illustrated in FIGS. 7-12. The channel conditions block 428 may be used to determine the channel condition between the scheduling entity and the subordinate entity 400. For example, the channel conditions block 428 may be used to determine a signal-to-noise ratio (SNR), a delay spread of a channel, and other channel characteristics.

The computer-readable medium 406 may provide code that when executed by the processor 404 configures the processing system 414 including the processor 404 to perform the functions described below in relation to FIGS. 7-14. The computer-readable medium 406 may provide search space resource allocation code 430 that may configure the subordinate entity to perform search space related functions such as sub-band division and CCE-REG mapping as described in detail below. The computer-readable medium 406 may provide DL communication code 432 that may configure the subordinate entity to perform DL communications with various a scheduling entity as described in relation to FIGS. 7-14.

Figure 5:
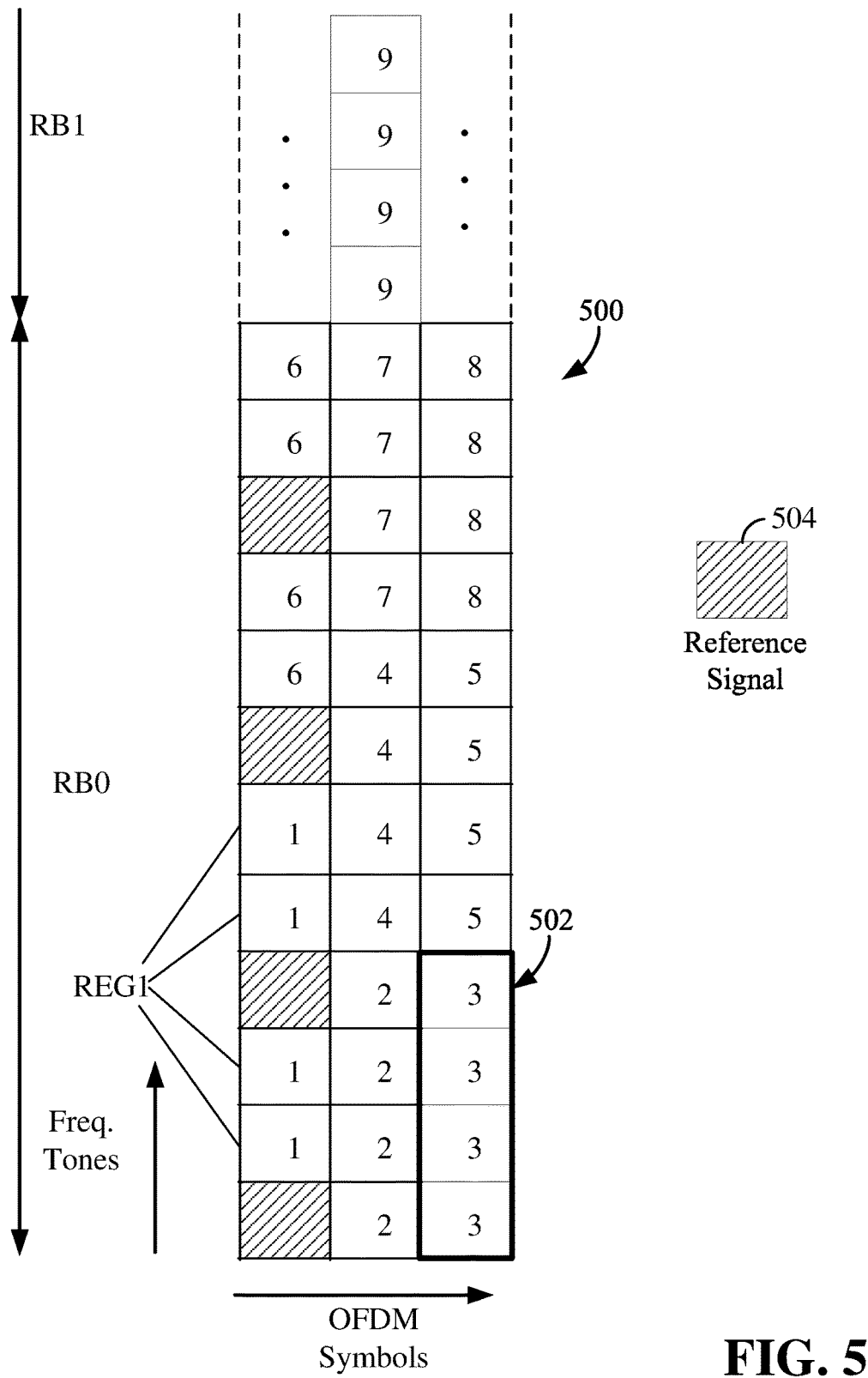
FIG. 5 is a diagram illustrating an example of resource element group (REG) arrangement according to an aspect of the disclosure.
Figure 6:
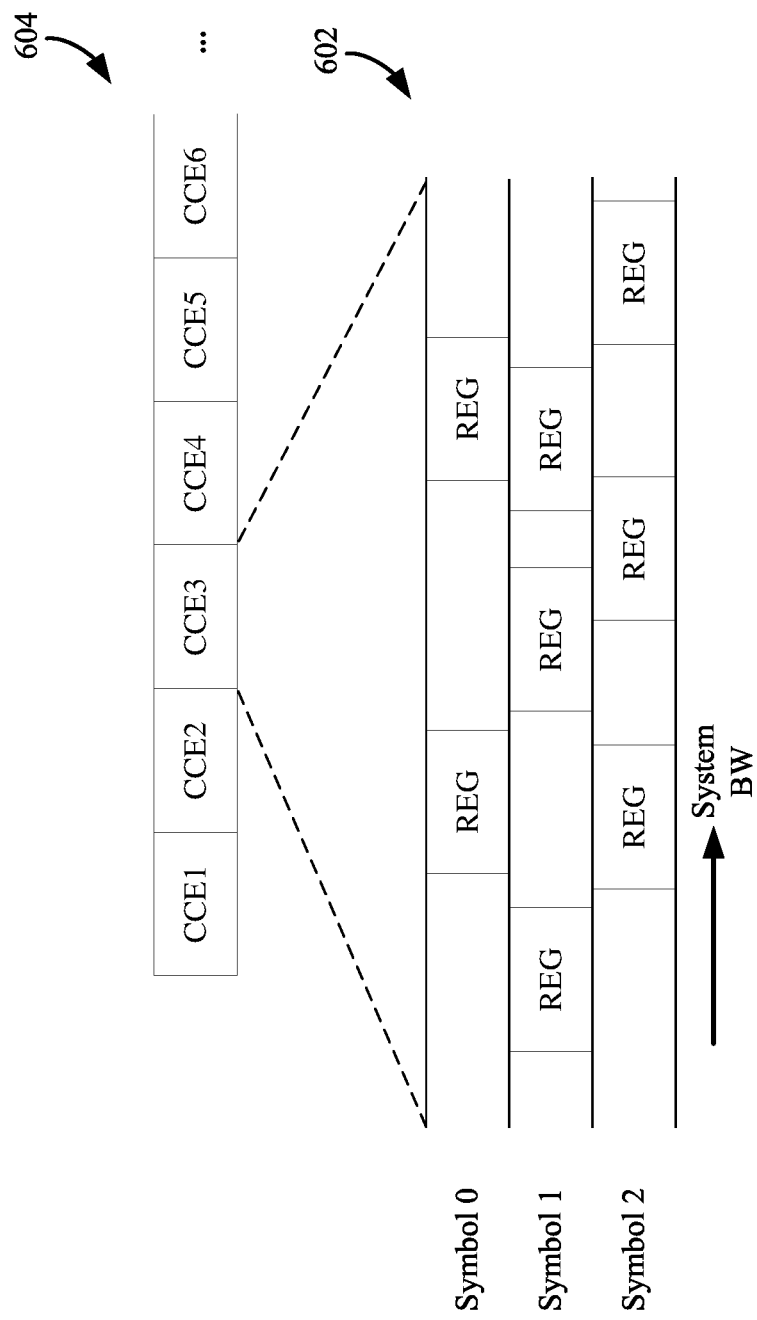
FIG. 6 is a diagram illustrating an example of control channel element (CCE) and REG mapping according to an aspect of the disclosure.

FIGS. 5 and 6 are diagrams illustrating an example of control channel element (CCE) allocation of a search space in accordance with an aspect of the present disclosure. FIG. 5 illustrates a portion of resource blocks (RB0 and RB1) 500 each including a number of resource elements. In FIG. 5, frequency or BW extends in the vertical direction, and time extends in the horizontal direction. The frequency or BW dimension is divided into units that may be referred to as frequency tones, OFDM tones, or sub-carriers; and the time dimension is divided into units that may be symbol durations or OFDM symbols. These intersecting divisions form a grid of resource elements (REs), such that each RE corresponds to a unit of one OFDM tone and one OFDM symbol.

In this example, a downlink control channel (e.g., PDCCH) utilizes the resource elements in the first three OFDM symbols of a DL subframe. In other examples, the PDCCH may utilize a different number of OFDM symbols at any positions (e.g., predetermined positions) of the DL subframe. The resource elements corresponding to the same OFDM symbol are grouped into resource element groups (e.g., resource element group 502). In this example, each resource element group (REG) includes four resource elements. Nine REGs each including four REs are shown in FIG. 5 (e.g., REG 1 through REG 9). In other aspects of the disclosure, an REG may have more or less resource elements in other examples. The resource elements may also be grouped into resource element groups different from those shown in FIG. 5.

FIG. 5 shows four exemplary reference signals 504 distributed in the first OFDM symbol. The reference signals 504 may be pilot symbols such as CRS and/or UERS. In other examples, the control channel may have more or fewer reference signals than those shown in FIG. 5. In some examples, the reference signals may be located in REs different from those shown in FIG. 5.

Referring to FIG. 6, a number of REGs 602 are grouped or mapped to a number of CCE 604 that are shown in a logical representation by their index numbers. Here, each REG 602 in FIG. 6 may be the same as the REGs 502 described above and illustrated in FIG. 5. For illustration, in FIG. 6, nine REGs 602 are mapped to one CCE3. A DL control channel or PDCCH may include any number of CCEs based on different aggregation levels, and the PDCCH may carry the downlink control information (DCI) and/or other control messages. A CCE may be assigned to the search space of one or more UEs or subordinate entities, and the UE may find its PDCCH in the assigned CCE(s). FIG. 6 shows one exemplary mapping between CCE3 and its REGs for brevity. In this example, nine REGs may be mapped to one CCE3 in an interleaving fashion (i.e., separated by one or more REs) such that adjacent REGs are not mapped to the same CCE. The REGs may be distributed among one or more resource blocks. Interleaving the REGs mapped to a CCE can enable diversity and mitigate interference.

In other aspects of the disclosure, any suitable number of REGs may be mapped to one CCE, and the mapping may be interleaved or non-interleaved. The number of CCEs available for carrying the control information may be variable depending on the number of OFDM symbols used, the bandwidth of the system, and/or a number of antenna ports present at the scheduling entity. In some examples, consecutive CCEs may be mapped into REGs that are distributed (i.e., non-consecutive) in frequency. Consecutive CCEs may refer to CCEs that are consecutive in their numbering or ordering in the logical space. Two REGs are not consecutive when they are not adjacent to each other (i.e., separated by one or more REs). This is called distributed CCE-to-REG mapping.

In some examples, consecutive CCEs are mapped to REGs that are consecutive in frequency. This is called localized CCE-to-REG mapping. For example, consecutive or adjacent REGs are not separated from each other by one or more REs.

Figure 7:
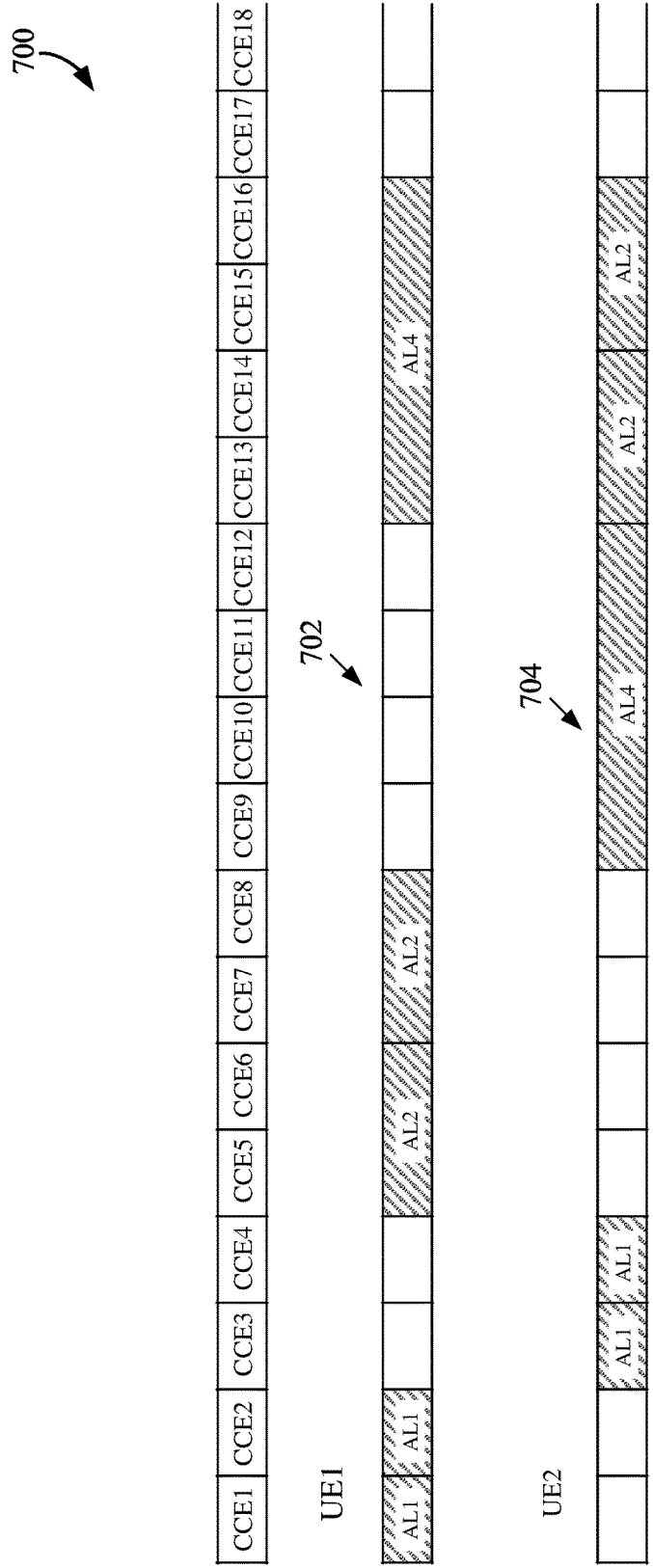
FIG. 7 is a diagram illustrating an example of a search space definition according to an aspect of the disclosure.

FIG. 7 is a diagram illustrating an example of a search space definition or design 700 in accordance with an aspect of the present disclosure. This search space definition 700 may be used in a DL control channel between any of the scheduling entities and subordinate entities illustrated in FIGS. 1, 2, 3, and/or 4. In FIG. 7, the CCEs are represented in a logical order by their index values (e.g., CCE index), and the CCEs may be allocated to different PDCCHs or search spaces. In one example, each CCE includes nine REGs or a predetermined number of REGs as shown in FIGS. 5 and 6. Each subordinate entity may first perform channel estimation based on a reference signal (e.g., a CRS and/or UERS as shown in FIG. 5), and then attempt to decode the PDCCH found within its search space (e.g., one or more CCEs). An aggregation level (AL) indicates a number of CCEs used to transmit a PDCCH message. That is, the number of CCEs used to transmit a PDCCH message may be called the AL. For example, a PDCCH message may be transmitted using 1, 2, 4, or 8 CCEs corresponding to the aggregation levels AL1, AL2, AL4, and AL8, respectively. A PDCCH message may be sent using different aggregation levels. Each of the CCEs may span a portion of the entire system BW, or the entire system BW. In this example, the search spaces of two subordinate entities (UE1 and UE2) are shown in FIG. 7 as hatched regions. For UE1, its search space 702 may include CCE1, CCE2, CCE5, CCE6, CCE7, CCE8, CCE13, CCE14, CCE15, and CCE16. For UE2, its search space 704 may include CCE3, CCE4, CCE9, CCE10, CCE11, CCE12, CCE13, CCE14, CCE15, and CCE16.

In FIG. 7, a generalized search space definition or design is shown, where a given UE's search space is defined as corresponding to a given set of CCEs at the logical layer. However, in order for a subordinate entity or UE to locate the set of CCEs in its search space at the physical layer, the UE may use information that maps the CCEs at the logical layer to their locations at the physical layer. If the CCEs assigned to a certain PDCCH are mapped to REGs that span a large portion of or the entire network BW, the UE needs to have the capability and/or resources to communicate with the network using the assigned portion of or the entire BW. However, the next generation network may have a large BW such that some low power or limited-capability UEs or devices (e.g., IoT devices) may not have the resources and/or capability to utilize the needed or full BW.

In one aspect of the disclosure, a scheduling entity may divide the full BW into multiple sub-bands, and each subordinate entity is configured to monitor one or more sub-bands. A search space of a subordinate entity is self-contained within each sub-band. That is, the CCE(s) of a UE is mapped to REGs located in the same sub-band(s). Therefore, a subordinate entity that cannot support or access the full BW can still be assigned a search space in a certain sub-band.

Figure 8:
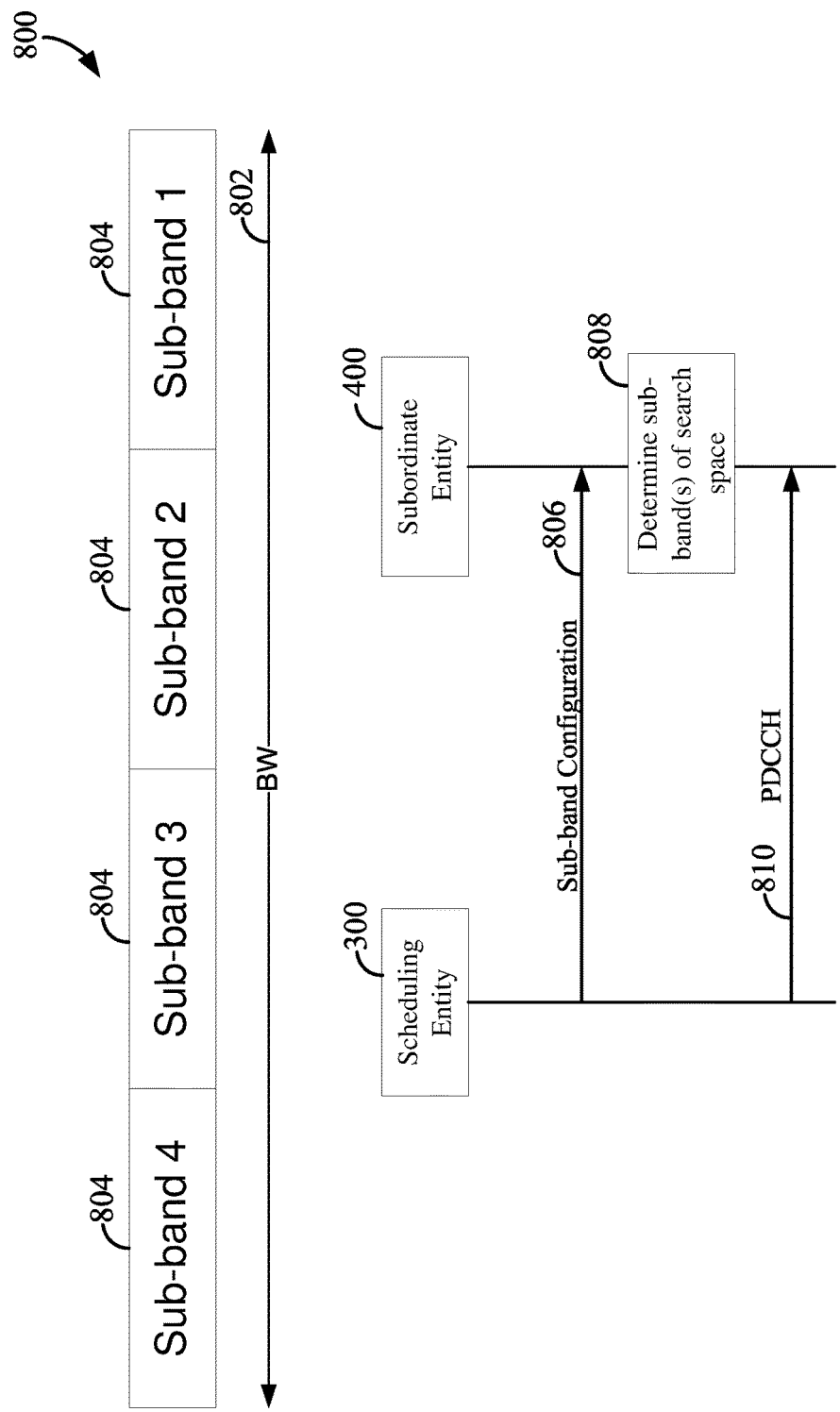
FIG. 8 is a diagram illustrating an example of a search space design utilizing sub-bands according to an aspect of the disclosure.

FIG. 8 is a diagram illustrating some examples of sub-bands 800 in accordance with an aspect of the present disclosure. In FIG. 8, frequency or BW extends in the horizontal direction. These sub-bands 800 may be used for a DL control channel (e.g., PDCCH) between any of the scheduling entities and subordinate entities illustrated in FIGS. 1, 2, 3, and/or 4. In this example, the entire system BW 802, or a portion of the system BW 802, may be divided into several sub-bands 804 (e.g., sub-band 1, sub-band 2, sub-band 3, and sub-band 4), and each sub-band may correspond to one or more RBs similar to those illustrated in FIG. 5. In other examples, the full BW 802 may be divided into greater or fewer than this number of sub-bands shown in FIG. 8. Each subordinate entity (e.g., UE) may be configured to monitor one or more of the sub-band(s) 804 (e.g., sub-band 1, sub-band 2, sub-band 3, and/or sub-band 4) for its CCE(s) or PDCCH. That is, a search space of the subordinate entity may include one or more sub-bands. The search space is self-contained within each sub-band such that REGs mapped to a CCE are located in the same sub-band.

In one example, the scheduling entity 300 may signal the sub-band configuration 806 to the subordinate entities 400 through RRC signaling or other suitable signaling or message passing methods. The sub-band configuration 806 may include information defining the sub-bands 804, and/or information identifying a set of one or more sub-bands that correspond to a search space for a given subordinate entity. Based on the sub-band configuration, a subordinate entity can determine 808 which sub-band(s) corresponds to its search space and/or the associated CCEs. Then, the subordinate entity can search and receive its PDCCH 810 in a search space from the associated sub-band(s). In another example, the scheduling entity may signal the sub-band configuration for all subordinate entities using a common sub-band or default sub-band (e.g., sub-band 4) that every subordinate entity monitors upon initial acquisition of service from the scheduling entity. After a subordinate entity determines the set of one or more sub-bands that correspond to that subordinate entity's search space, the subordinate entity may switch or retune from the common sub-band to its assigned sub-band(s) to search for its PDCCH or DL control channel.

Figure 9:
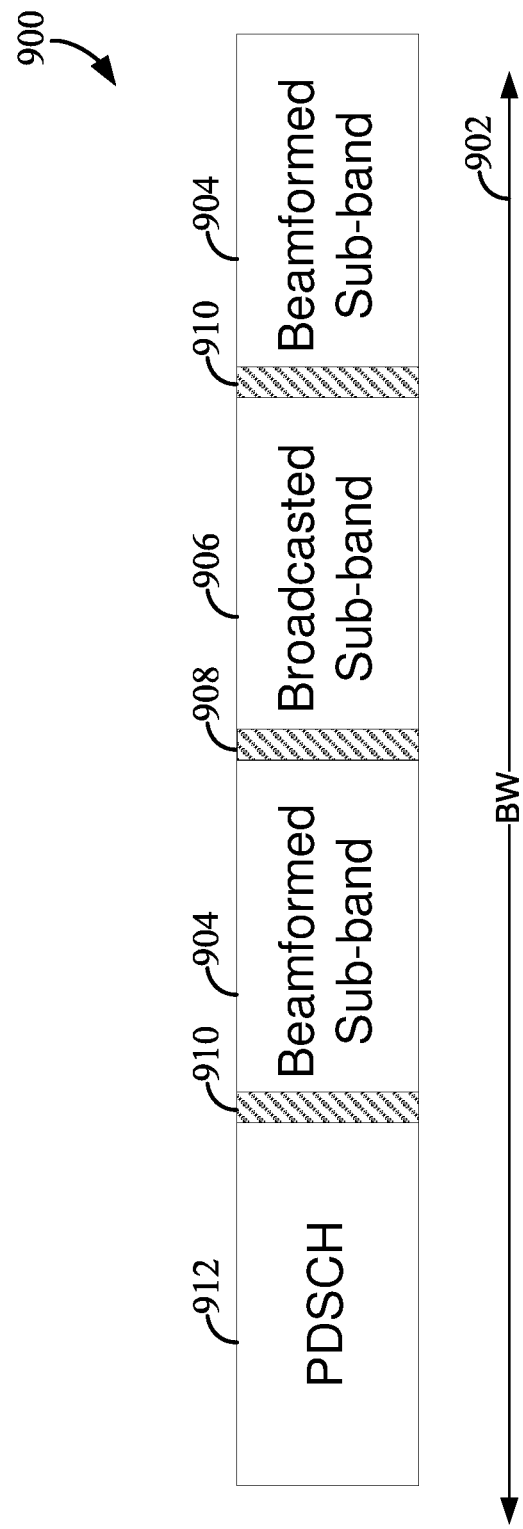
FIG. 9 is a diagram illustrating an example of a search space design utilizing a plurality of sub-band configurations according to an aspect of the disclosure.

FIG. 9 is a diagram illustrating an example of a search space design 900 utilizing a plurality of sub-band configurations in accordance with an aspect of the present disclosure. In FIG. 9, frequency or BW extends in the horizontal direction. This search space design 900 may be used in a DL control channel (e.g., PDCCH) between any of the scheduling entities and subordinate entities illustrated in FIGS. 1, 2, 3, and/or 4. In the search space design 900, the entire system BW 902 or a portion of the entire system BW 902 may be divided into several sub-bands. Each sub-band may correspond to one or more RBs. A search space associated with a sub-band is self-contained such that all REGs mapped to a certain CCE are located in the same sub-band. A subordinate entity may be configured to monitor one or more sub-bands for its search space.

In some aspects of the disclosure, the sub-bands of FIG. 9 may have different configurations, for example, beamformed control sub-bands 904 and broadcast-based control sub-band 906. The broadcast-based sub-band 906 may be used to transmit PDCCH(s) for sending control information that is common for all the UEs or subordinate entities that include this sub-band in their search spaces (e.g., a common search space). The beamformed control sub-bands 904 may be used to transmit PDCCH(s) for sending control information for a set of one or more particular UEs or subordinate entities that include this beamformed control sub-band in the search space (e.g., UE-specific search space).

In a broadcast-based sub-band 906, a scheduling entity may broadcast a reference signal 908 (e.g., CRS) to the subordinate entities (e.g., UEs) assigned to this sub-band, and each subordinate entity can utilize the broadcasted reference signal to decode the DL control information in the broadcast-based sub-band. In a beamformed control sub-band 904, a scheduling entity may transmit a UE-specific reference signal 910 (e.g., UERS) that is targeted to a specific UE. The transmission to the specific UE may be spatially focused using any known beamforming or diversity techniques. The control information in the beamformed control sub-band 904 is configured to be decoded by the specific or destined UE. In some aspects of the disclosure, the scheduling entity may also transmit control information to a specific subordinate entity in a broadcast-based sub-band. That is, the scheduling entity may transmit, for example, both CRS and UERS in the same sub-band. The reference signals 908 and 910 illustrated in FIG. 9 are positioned at the beginning portions of the respective sub-bands, but may be positioned in any portion of the corresponding sub-bands in other examples.

In some examples, when the control information transmission load is small, certain sub-band(s) 912 may be recycled, repurposed, or used as a data channel for transmitting user data. The control information transmission load refers to the amount of control data utilizing the DL bandwidth or sub-bands. An example of such data channel is the Physical Downlink Shared Channel (PDSCH) 912 shown in FIG. 9.

Figure 10:
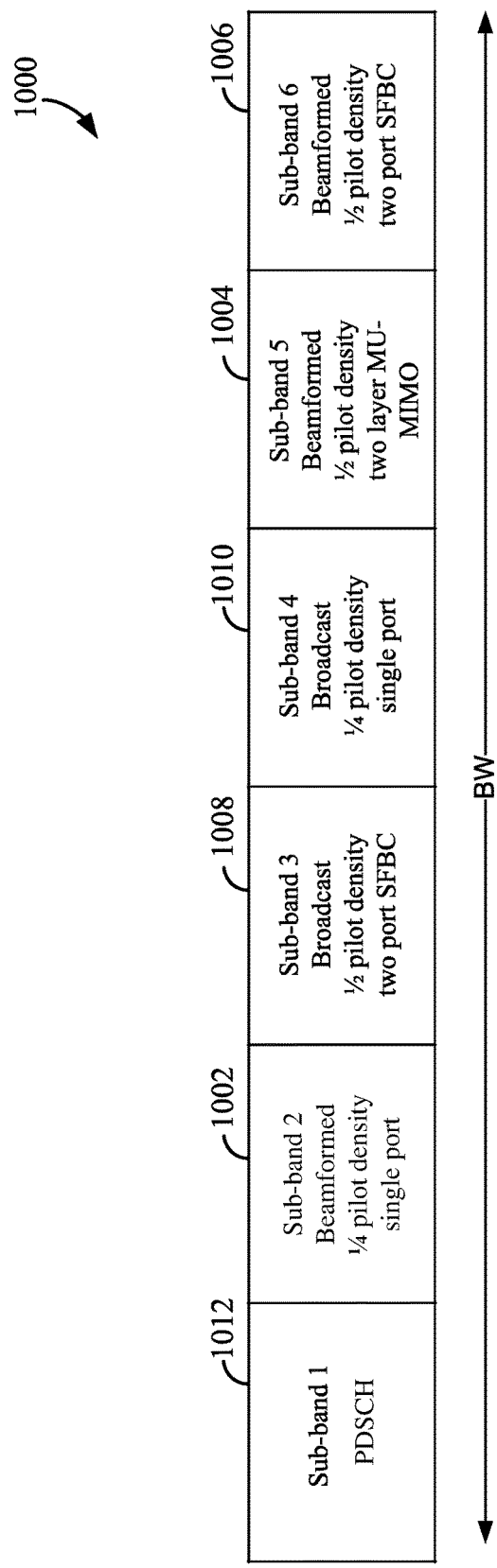
FIG. 10 is a diagram illustrating another example of a search space design utilizing different beamform-based sub-band and broadcast control sub-band configurations according to an aspect of the disclosure.

FIG. 10 is a diagram illustrating an example of a search space design 1000 utilizing various beamformed control sub-band configurations and broadcast-based control sub-band configurations in accordance with an aspect of the present disclosure. In FIG. 10, frequency or BW extends in the horizontal direction. This search space design 1000 may be used in a DL control channel (e.g., PDCCH) between any of the scheduling entities and subordinate entities illustrated in FIGS. 1, 2, 3, and/or 4. In this example, the DL bandwidth may be divided into six sub-bands. Sub-band two 1002, sub-band five 1004, and sub-band six 1006 are beamformed control sub-bands. Sub-band three 1008 and sub-band four 1010 are broadcast-based control sub-bands. Sub-band one 1012 may be reused for a data channel (e.g., PDSCH shown in FIG. 10). Each sub-band of FIG. 10 may correspond to one or more RBs. A search space associated with a sub-band is self-contained such that all REGs mapped to a certain CCE are located in the same sub-band. A subordinate entity is configured to monitor one or more sub-bands for its search space.

In various aspects of the disclosure, these sub-bands may be configured to adapt to channel conditions or profiles for different subordinate entities. Some examples of channel conditions are signal-to-noise ratio (SNR) and delay spread. For example, the sub-bands may be configured to have different pilot densities (e.g., ¼ pilot density, ½ pilot density, etc.). Pilot density is a ratio between pilot/reference signals and non-pilot signals among the DL symbols. Examples of the pilot signals are CRS and UERS. In some examples, a sub-band may be configured to utilize single port (antenna port), two-port space frequency block coding (SFBC), and/or two-layer MU-MIMO.

In some examples, a UE can use channel quality indication (CQI) feedback to inform the base station or scheduling entity about the UE's channel state information, which may include SNR, delay spread, Doppler frequency, etc. The scheduling entity, then can group certain UEs with similar channel condition to a single control sub-band. The grouping decision can be conveyed to the UEs through radio resource control (RRC) signaling, or it can be conveyed to the UEs through a common control sub-band which is monitored every UE.

The sub-band configurations illustrated FIG. 10 are non-limiting examples, and the sub-bands may have other configurations adapted for different subordinate entities and/or channels. Moreover, the sub-band configuration may be changed dynamically in different TTIs due to changing channel conditions. For example, the same sub-band may have different configurations for the same subordinate entity in different TTIs based on channel conditions.

Figure 11:
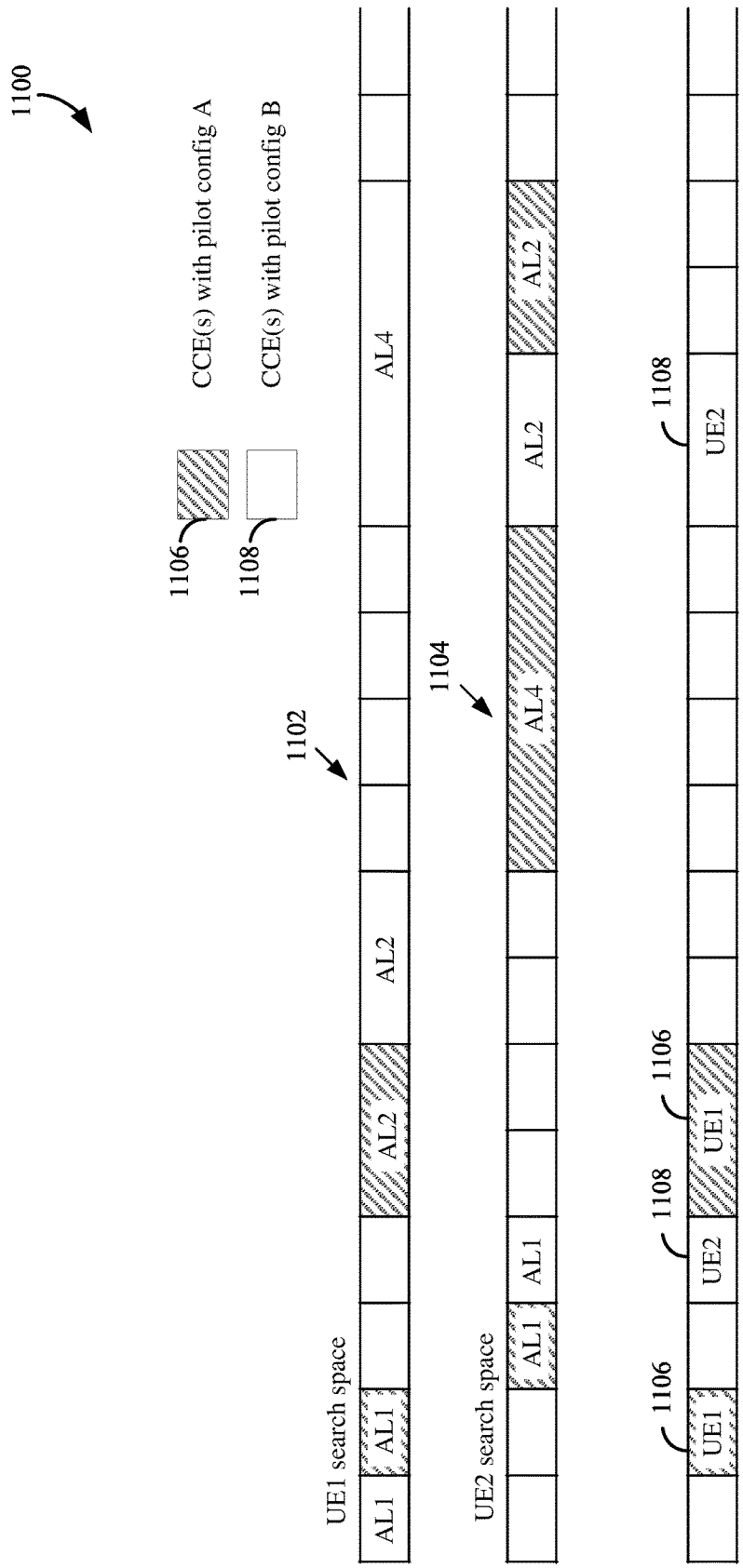
FIG. 11 is a diagram illustrating an example of a search space design for beamformed control sub-bands utilizing different pilot configurations according to an aspect of the disclosure.

FIG. 11 is a diagram illustrating an example of a search space design 1100 for beamformed control sub-bands utilizing different pilot configurations in accordance with an aspect of the present disclosure. This search space design 1100 may be used in a DL control channel (e.g., PDCCH) between any of the scheduling entities and subordinate entities illustrated in FIGS. 1, 2, 3, and/or 4. In FIG. 11, the search spaces are represented in a logical order corresponding to CCE index values similar to those shown in FIG. 7. In one example, the search space 1102 for a first subordinate entity (UE1) is represented in FIG. 11 in different CCE aggregation levels (e.g., AL1, AL2 and AL4). Similarly, the search space 1104 for a second subordinate entity (UE2) in represented in FIG. 11 in different CCE aggregation levels (e.g., AL1, AL2 and AL4). The search space design of FIG. 11 may be self-contained in a beamformed control sub-band similar to those described in relation to FIGS. 9-10.

A beamformed control sub-band may be configured according to the channel conditions for different subordinate entities. In this example, two subordinate entities (UE1 and UE2) are assigned to a search space that contains a beamformed control sub-band. In one aspect of the disclosure, the search space 1102 of the first subordinate entity (UE1) may be configured to use two different pilot configurations (e.g., ¼ pilot density or ½ pilot density). For example, some CCEs of the search space are configured to use a first pilot configuration 1106, and some CCEs are configured to use a second pilot configuration 1108. Similarly, the search space 1104 of the second subordinate entity (UE2) may be configured to use two different pilot configurations 1106 and 1108 as shown in FIG. 11. That is, the pilot density for a control channel (e.g., PDCCH) may be a function of the search space. For example, the pilot density may be determined by assigning a subordinate entity to a certain search space. In one example, a UE may have more than three aggregation-level-1 (AL1) search locations, and a pre-defined rule may map different search locations into different pilot density options. In other examples, the first and second subordinate entities may have different search space design using different pilot configurations. In one example, the scheduling entity may transmit the PDCCH to the first subordinate entity using CCEs 1106, and transmit the PDCCH to the second subordinate entity using CCEs 1108 that have a different pilot configuration.

Figure 12:
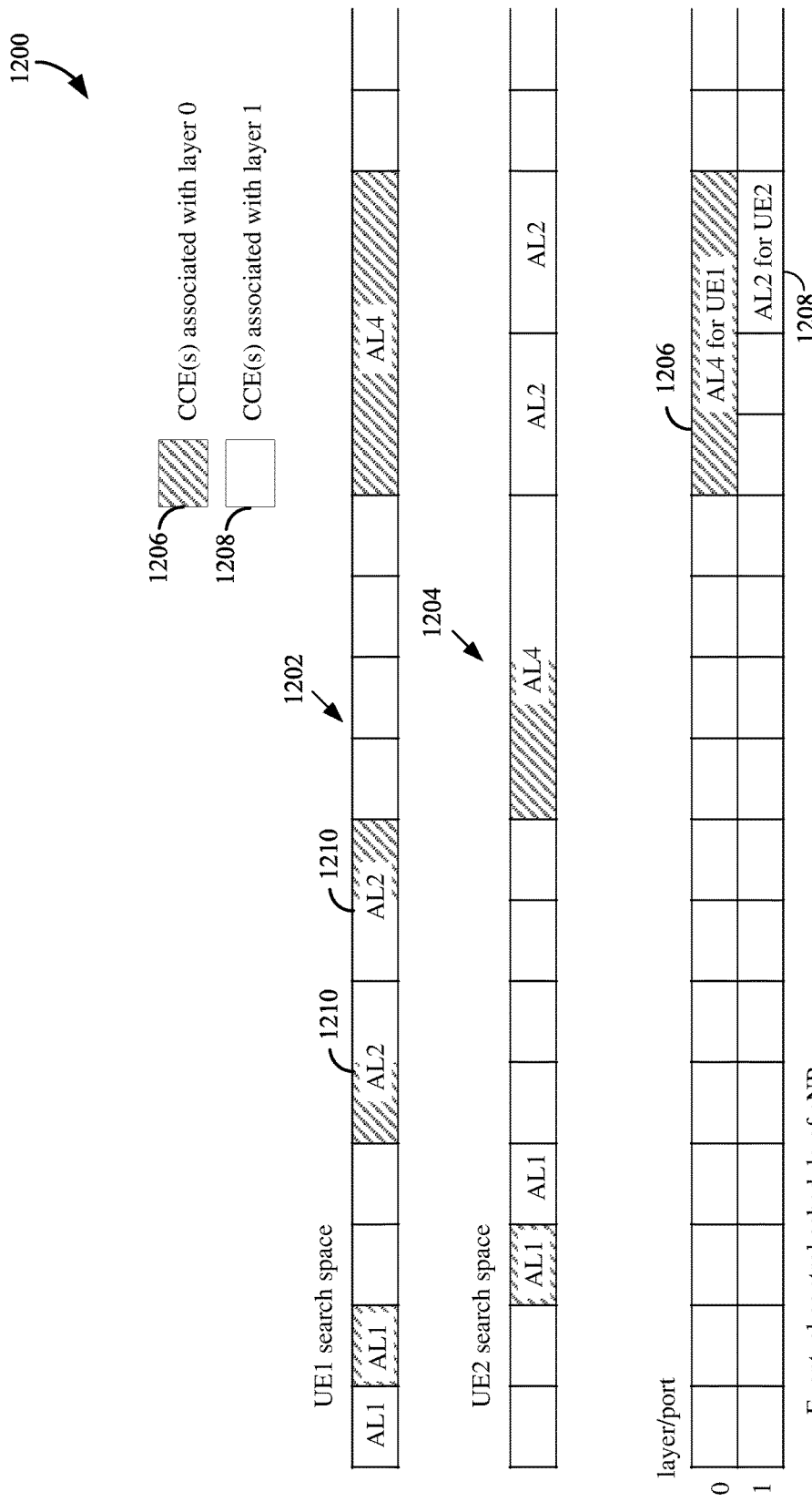
FIG. 12 is a diagram illustrating an example of a search space design for beamformed control sub-bands utilizing multi-user multiple-input and multiple-output (MU-MIMO) according to an aspect of the disclosure.

FIG. 12 is a diagram illustrating an example of a search space design 1200 for beamformed control sub-bands utilizing MU-MIMO in accordance with an aspect of the present disclosure. This search space design 1200 may be used in a DL control channel (e.g., PDCCH) between any of the scheduling entities and subordinate entities illustrated in FIGS. 1, 2, 3, and/or 4. In FIG. 12, the search spaces are represented in a logical order corresponding to CCE index values similar to those shown in FIG. 7. In one example, the search space 1202 for a first subordinate entity (UE1) may be represented in different CCE aggregation levels (e.g., AL1, AL2 and AL4). Similarly, the search space 1204 for a second subordinate entity (UE2) may be represented in different CCE aggregation levels (e.g., AL1, AL2 and AL4). The search space design of FIG. 12 may be self-contained in a beamformed control sub-band similar to those shown in FIGS. 9-10.

In one example, two subordinate entities (UE1 and UE2) may be assigned to respective self-contained search spaces that contain beamformed control sub-bands. The transmission mode(s) of a control channel may be a function of a search space. For example, different transmission modes may include single-layer mode, two-layer SFBC mode, multi-layer MIMO mode, multi-layer MU-MIMO mode, etc. In case of MU-MIMO mode, the MIMO layer to UE mapping may be a function of the search space. (e.g., the UE can infer its layer-ID from its search space. In an MU-MIMO example, the CCEs of a search space may be associated with different MIMO layers/ports.

In one aspect of the disclosure, the search space 1202 of the first subordinate entity (UE1) may be configured to use two different MU-MIMO layer/port configurations. For example, the search space 1202 of UE 1 includes some CCEs configured to use the MU-MIMO layer 0 1206, and some CCEs configured to use the MU-MIMO layer 1 1208. Similarly, the search space 1204 of UE2 may be configured to use two different MU-MIMO layer/port configurations as shown in FIG. 12. In some aspects of the disclosure, a scheduling entity may transmit a PDCCH message 1210 using multiple CCEs (e.g., AL2, AL4) corresponding to two different MIMO layers/ports (e.g., layers 1206 and 1208). That is, some of the CCEs are associated with layer 0, and some other CCEs are associated with layer 1. In some examples, a search space may have other combinations of MU-MIMO layer/port configurations. In one example, the scheduling entity may transmit the PDCCH to the first subordinate entity using CCEs 1206 associated with layer 0, and transmit the PDCCH to the second subordinate entity using CCEs 1208 that are associated with a different MU-MIMO layer.

Figure 13:
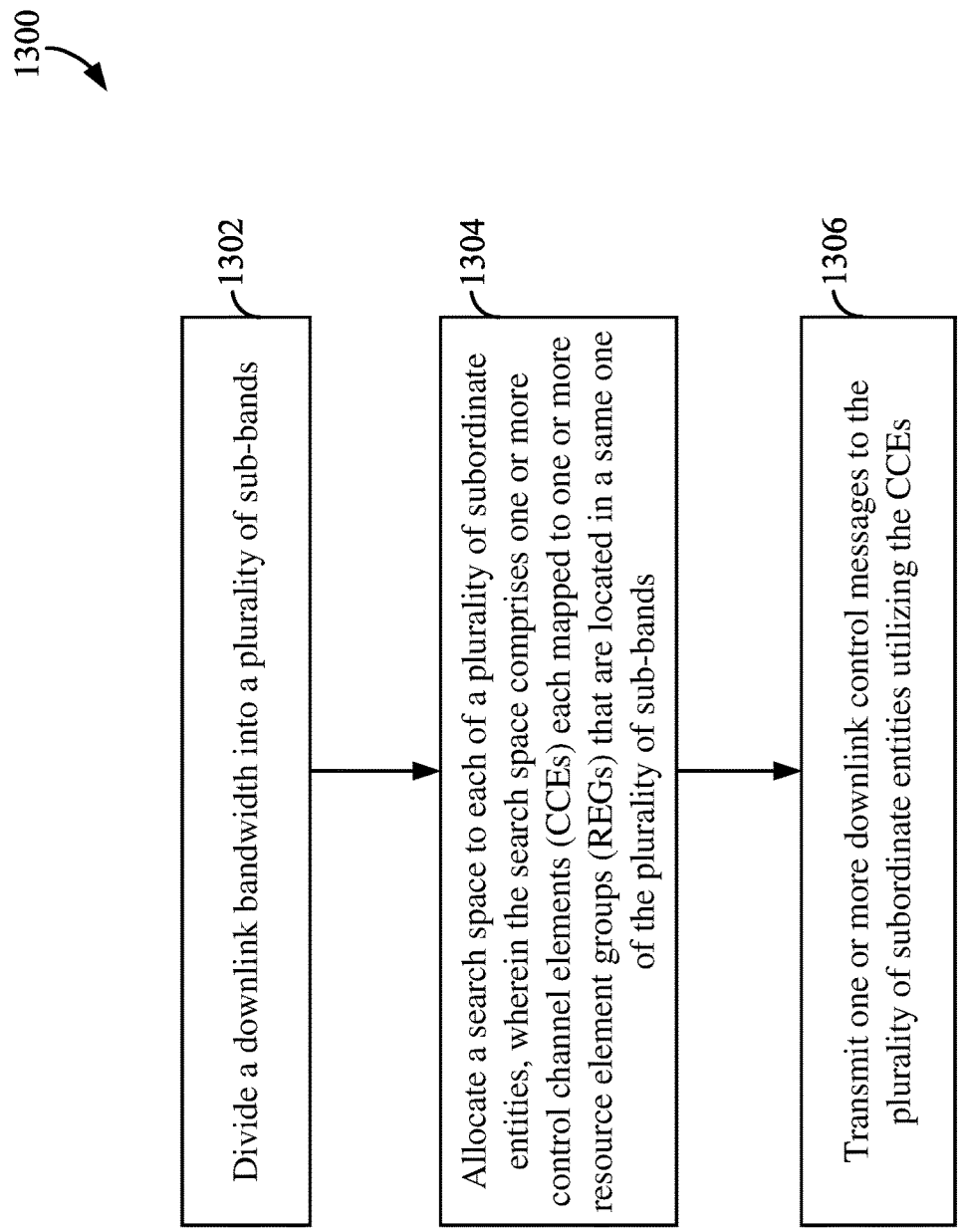
FIG. 13 is a flowchart illustrating a wireless communication method operable at a scheduling entity in accordance with an aspect of the disclosure.

FIG. 13 is a flowchart illustrating a wireless communication method 1300 operable at a scheduling entity in accordance with an aspect of the disclosure. The method 1300 may be performed by any of the scheduling entity illustrated in FIGS. 1, 2, and/or 3 or any apparatus. At block 1302, a scheduling entity may utilize a sub-band control block 322 (see FIG. 3) to divide a downlink bandwidth into a plurality of sub-bands. These sub-bands may be the same as the self-contained sub-bands illustrated in FIGS. 8-10. The divided downlink bandwidth may the entire network bandwidth or a portion of the network bandwidth. In some examples, the sub-bands may have the same or different bandwidths. The sub-bands may have the same or different configurations (e.g., pilot configurations and/or MU-MIMO layer/port configurations).

At block 1304, the scheduling entity may utilize the CCE-REG mapping block 324 to allocate a search space to each of a plurality of subordinate entities. Each search space includes one or more CCEs each mapped to one or more REGs that are located in a same one of the plurality of sub-bands. For examples, the CCEs may be the same as those illustrated in FIGS. 6, 7, 11, and/or 12. The scheduling entity may map consecutive CCEs (i.e., consecutive in CCE index values) to REGs that are distributed and/or consecutive in frequency. Two REGs are consecutive in frequency when they are adjacent to each other (e.g., REG2 and REG 4 of FIG. 5) with no resource element(s) located in between.

At block 1306, the scheduling entity may utilize a transceiver 310 and/or a DL communication block 326 (see FIG. 3) to transmit one or more downlink control messages (e.g., PDCCH messages) to one or more subordinate entities utilizing the CCEs. In some aspects of the disclosure, the sub-bands for different subordinate entities may have different configurations such as pilot configuration, broadcasted or beamformed reference signal, MIMO ports/layers, etc. In one example, the scheduling entity may transmit a broadcast reference signal in some sub-bands and a UE-specific reference signal in other sub-bands similar to those illustrated in FIGS. 9 and 10. In one example, the scheduling entity may transmit the downlink control messages utilizing two or more pilot configurations in some sub-bands. In one example, the scheduling entity may transmit the downlink control messages utilizing two or more MU-MIMO layers in a same sub-band.

Figure 14:
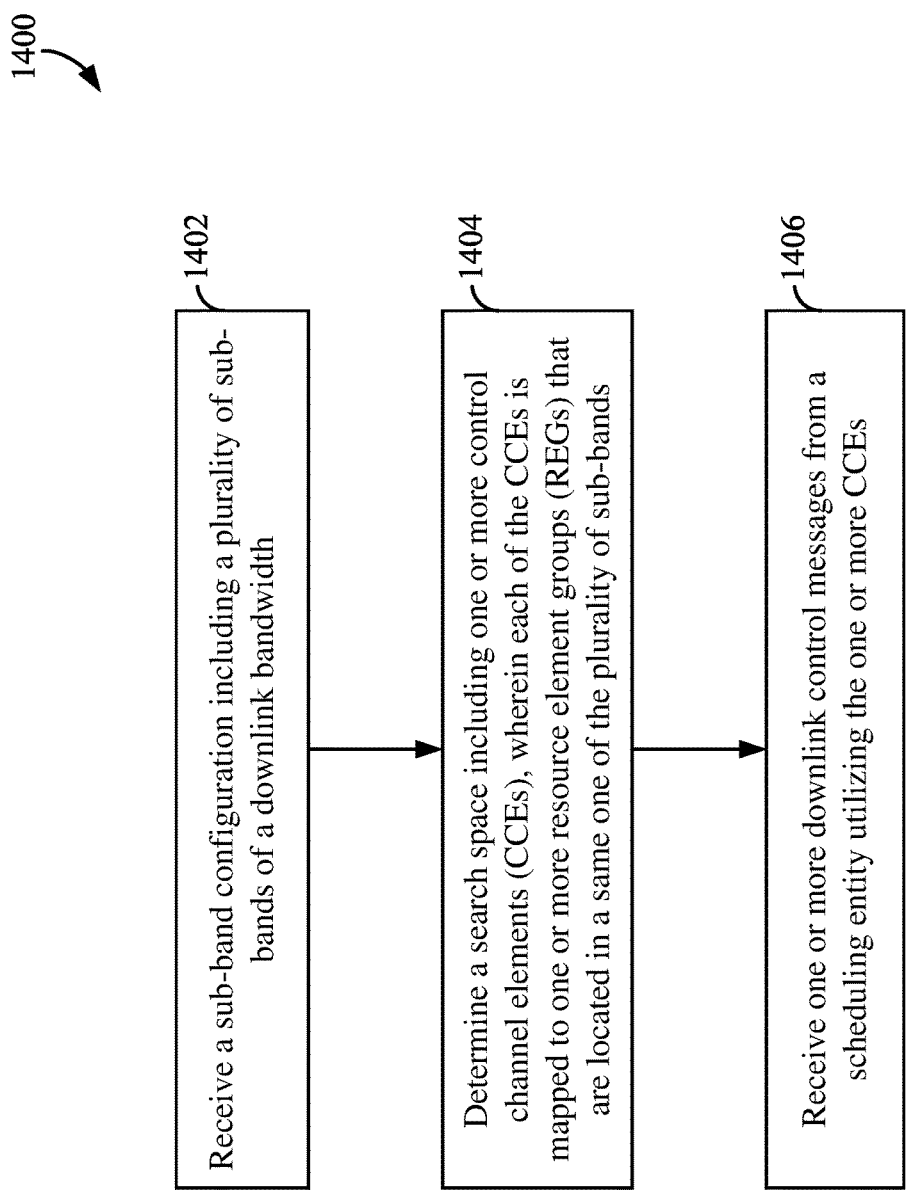
FIG. 14 is a flowchart illustrating a wireless communication method operable at a subordinate entity in accordance with an aspect of the disclosure.

FIG. 14 is a flowchart illustrating a wireless communication method 1400 operable at a subordinate entity in accordance with an aspect of the disclosure. The method 1400 may be performed by any of the subordinate entity illustrated in FIGS. 1, 2, and/or 4 or any apparatus. At block 1402, the subordinate entity may utilize a sub-band control block 422 and/or a transceiver 410 (see FIG. 4) to receive a sub-band configuration 806 (see FIG. 8) that includes a plurality of sub-bands of a downlink bandwidth. For example, the sub-bands may be similar to the self-contained sub-bands illustrated in FIGS. 8-10.

At block 1404, the subordinate entity may utilize a CCE-REG mapping block 424 (see FIG. 4) to determine a search space including one or more CCEs, wherein each of the CCEs is mapped to one or more REGs that are located in a same one of the plurality of sub-bands. For examples, the CCEs may be the same as those illustrated in FIGS. 6,7,11, and/or 12.

At block 1406, the subordinate entity may utilize a DL communication block 426 and/or a transceiver 410 (see FIG. 4) to receive one or more downlink control messages from a scheduling entity utilizing the one or more CCEs. For example, the subordinate entity may receive one or more PDCCH messages from a scheduling entity utilizing the CCEs. In one example, the subordinate entity may receive a broadcast reference signal in some sub-bands and a UE-specific reference signal in other sub-bands. In some examples, the subordinate entity may receive consecutive CCEs mapped to REGs that are distributed or consecutive in frequency. In some examples, the sub-bands may have different configurations such as pilot configuration, broadcasted or beamformed reference signal, MIMO layers, etc. In some examples, the subordinate entity may utilize two or more pilot configurations for receiving the CCEs in a same sub-band. In some examples, the subordinate entity may utilize two or more MU-MIMO layers for receiving the CCEs in a same sub-band.

In one configuration, the apparatus 300 for wireless communication includes means for dividing a downlink bandwidth into a plurality of sub-bands; means for allocating a search space to each of a plurality of subordinate entities, wherein the search space includes one or more CCEs each mapped to one or more REGs that are located in a same one of the plurality of sub-bands; and means for transmitting one or more downlink control messages to the plurality of subordinate entities utilizing the one or more CCEs.

In one aspect, the aforementioned means may be the processor(s) 304 in which the invention resides from FIGS. 7-14 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIG. 1 or 2, and utilizing, for example, the processes and/or algorithms described herein in relation to FIGS. 7-14.

In one configuration, the apparatus 400 for wireless communication includes means for receiving a sub-band configuration including a plurality of sub-bands of a downlink bandwidth, means for determining a search space including one or more CCEs, wherein each of the CCEs is mapped to one or more REGs that are located in a same one of the plurality of sub-bands; and means for receiving one or more downlink control messages from a scheduling entity utilizing the one or more CCEs.

In one aspect, the aforementioned means may be the processor(s) 404 in which the invention resides from FIGS. 7-14 configured to perform the functions recited by the aforementioned means. In another aspect, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIG. 1 or 2, and utilizing, for example, the processes and/or algorithms described herein in relation to FIGS. 7-14.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (WI-FI®), IEEE 802.16 (WI- MAX®), IEEE 802.20, Ultra-Wideband (UWB), BLUETOOTH®, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduling entity, comprising:
   dividing a bandwidth into a plurality of sub-bands;
   allocating a search space to each of a plurality of subordinate entities, wherein the search space comprises one or more control channel elements (CCEs) each mapped to one or more resource element groups (REGs) that are located in a same one of the plurality of sub-bands;
   configuring at least two of the plurality of sub-bands to have respective sub-band configurations that are different in terms of at least one of reference signal configuration or pilot density configuration, wherein a first sub-band is configured as a broadcast-based control sub-band and a second sub-band is configured as a beamformed control sub-band;
   transmitting a broadcast signal in the broadcast-based control sub-band;
   transmitting a UE-specific signal in the beamformed control sub-band; and
   transmitting one or more downlink control messages to the plurality of subordinate entities utilizing the one or more CCEs.

2. The method of claim 1, further comprising:
   mapping consecutive CCEs of the one or more CCEs to the REGs, wherein the REGs are distributed in frequency or consecutive in frequency.

3. The method of claim 1, further comprising:
   determining a pilot density as a function of the search space.

4. The method of claim 1, further comprising:
   determining a transmission mode as a function of the search space, wherein the transmission mode comprises at least one of single-layer mode, two-layer two-port space frequency block coding (SFBC) mode, multi-layer multiple-input and multiple-output (MIMO) mode, or multi-user MIMO mode.

5. The method of claim 4, further comprising:
   determining a MIMO layer of a subordinate entity operating in the multi-user MIMO mode based on the search space of the subordinate entity.

6. The method of claim 1, wherein a sub-band of the plurality of sub-bands is configured to have different configurations for a same subordinate entity in different transmission time intervals based on channel conditions.

7. A method of wireless communication operable at a subordinate entity, comprising:
   receiving, from a scheduling entity, a sub-band configuration that indicates a plurality of sub-bands of a bandwidth, wherein at least two of the plurality of sub-bands have respective sub-band configurations that are different in terms of at least one of reference signal configuration or pilot density configuration, wherein a first sub-band is configured as a broadcast-based control sub-band and a second sub-band is configured as a beamformed control sub-band;

determining a search space comprising one or more control channel elements (CCEs), wherein each of the CCEs is mapped to one or more resource element groups (REGs) that are located in a same one of the plurality of sub-bands;

receiving a broadcast signal in the broadcast-based control sub-band;

receiving a UE-specific signal in the beamformed control sub-band; and receiving one or more downlink control messages from the scheduling entity utilizing the one or more CCEs.

8. The method of claim 7, wherein the one or more CCEs comprise:

consecutive CCEs that are mapped to the REGs that are distributed in frequency or consecutive in frequency.

9. The method of claim 7, further comprising:

receiving user data in a Physical Downlink Shared Channel (PDSCH) utilizing one of the plurality of sub-bands.

10. The method of claim 7, further comprising:

determining a pilot density as a function of the search space.

11. The method of claim 7, further comprising:

determining a transmission mode as a function of the search space, wherein the transmission mode comprises at least one of single-layer mode, two-layer two-port space frequency block coding (SFBC) mode, multi-layer multiple-input and multiple-output (MIMO) mode, or multi-user MIMO mode.

12. The method of claim 11, further comprising:

determining a MIMO layer when operating in the multi-user MIMO mode based on the search space of the subordinate entity.

13. The method of claim 7, wherein a sub-band of the plurality of sub-bands is configured to have different configurations for a same subordinate entity in different transmission time intervals based on channel conditions.

14. A scheduling entity configured for wireless communication comprising:

a communication interface configured to communicate with a plurality of subordinate entities;

a memory storing executable code; and a processor operatively coupled to the communication interface and the memory, wherein the processor is configured by the executable code to:

divide a bandwidth into a plurality of sub-bands;

allocate a search space to each of the plurality of subordinate entities, wherein the search space comprises one or more control channel elements (CCEs) each mapped to one or more resource element groups (REGs) that are located in a same one of the plurality of sub-bands;

configure at least two of the plurality of sub-bands to have respective sub-band configurations that are different in terms of at least one of reference signal configuration or pilot density configuration, wherein a first sub-band is configured as a broadcast-based control sub-band and a second sub-band is configured as a beamformed control sub-band;

transmit a broadcast signal, utilizing the communication interface, in the broadcast-based control sub-band;

transmit a UE-specific signal, utilizing the communication interface, in the beamformed control sub-band; and transmit one or more downlink control messages, utilizing the communication interface, to the plurality of subordinate entities utilizing the one or more CCEs.

15. The scheduling entity of claim 14, wherein the processor is further configured to:

map consecutive CCEs of the one or more CCEs to the REGs, wherein the REGs are distributed in frequency or consecutive in frequency.

16. The scheduling entity of claim 14, wherein the processor is further configured to:

determine a pilot density as a function of the search space.

17. The scheduling entity of claim 14, wherein the processor is further configured to:

determine a transmission mode as a function of the search space, wherein the transmission mode comprises at least one of single-layer mode, two-layer two-port space frequency block coding (SFBC) mode, multi-layer multiple-input and multiple-output (MIMO) mode, or multi-user MIMO mode.

18. The scheduling entity of claim 17, wherein the processor is further configured to:

determine a MIMO layer of a subordinate entity operating in the multi-user MIMO mode based on the search space of the subordinate entity.

19. A subordinate entity configured for wireless communication comprising:

a communication interface configured to communicate with a scheduling entity;

a memory storing executable code; and a processor operatively coupled to the communication interface and the memory, wherein the processor is configured by the executable code to:

receive a sub-band configuration that indicates a plurality of sub-bands of a bandwidth, wherein at least two of the plurality of sub-bands have respective sub-band configurations that are different in terms of at least one of reference signal configuration or pilot density configuration, wherein a first sub-band is configured as a broadcast-based control sub-band and a second sub-band is configured as a beamformed control sub-band;

determine a search space comprising one or more control channel elements (CCEs), wherein each of the CCEs is mapped to one or more resource element groups (REGs) that are located in a same one of the plurality of sub-bands;

receive a broadcast signal, utilizing the communication interface, in the broadcast-based control sub-band;

receive a UE-specific signal, utilizing the communication interface, in the beamformed control sub-band; and receive one or more downlink control messages, utilizing the communication interface, from the scheduling entity utilizing the one or more CCEs.

20. The subordinate entity of claim 19, wherein the one or more CCEs comprise:

consecutive CCEs that are mapped to the REGs that are distributed in frequency or consecutive in frequency.

21. The subordinate entity of claim 19, wherein the processor is further configured to:

receive user data in a Physical Downlink Shared Channel (PDSCH) utilizing one of the plurality of sub-bands.

22. The subordinate entity of claim 19, wherein the processor is further configured to:

determine a pilot density as a function of the search space.

23. The subordinate entity of claim 19, wherein the processor is further configured to:

determine a transmission mode as a function of the search space, wherein the transmission mode comprises at least one of single-layer mode, two-layer two-port space frequency block coding (SFBC) mode, multi-layer multiple-input and multiple-output (MIMO) mode, or multi-user MIMO mode.

24. The subordinate entity of claim 23, wherein the processor is further configured to:
  determine a MIMO layer when operating in the multi-user MIMO mode based on the search space of the subordinate entity.

* * * * *